US012769297B2

(12) United States Patent
Miyazono

(10) Patent No.: US 12,769,297 B2
(45) Date of Patent: Oct. 20, 2026

(54) INFORMATION PROCESSING APPARATUS, INFORMATION PROCESSING METHOD, AND COMPUTER-READABLE RECORDING MEDIUM

(71) Applicant: Yokogawa Electric Corporation, Tokyo (JP)

(72) Inventor: Shinichi Miyazono, Tokyo (JP)

(73) Assignee: Yokogawa Electric Coproration, Tokyo (JP)

( * ) Notice: Subject to any disclaimer, the term of this patent is extended or adjusted under 35 U.S.C. 154(b) by 462 days.

(21) Appl. No.: 18/458,247

(22) Filed: Aug. 30, 2023

(65) Prior Publication Data

US 2024/0077865 A1 Mar. 7, 2024

(30) Foreign Application Priority Data

Sep. 2, 2022 (JP) ................................ 2022-140297

(51) Int. Cl.
*G05B 23/02* (2006.01)

(52) U.S. Cl.
CPC ................................ *G05B 23/0254* (2013.01)

(58) Field of Classification Search
CPC .... G05B 23/0254; G05B 23/024; G06N 5/01; G06N 20/00
See application file for complete search history.

(56) References Cited

U.S. PATENT DOCUMENTS

2020/0379454 A1* 12/2020 Trinh ..................... G06N 20/00
2022/0065705 A1* 3/2022 Furukawa .............. G01K 3/005
2022/0365525 A1* 11/2022 Minisankar ............ G06N 20/00
2023/0045162 A1 2/2023 Yamamoto et al.
2023/0305551 A1* 9/2023 Koh ..................... G05B 23/024

FOREIGN PATENT DOCUMENTS

| | | | | | |
|---|---|---|---|---|---|
| JP | H09245013 | A | | 9/1997 | |
| JP | 2017033526 | A | * | 2/2017 | ......... G05B 19/4065 |
| JP | 2021022276 | A | | 2/2021 | |
| JP | 2021107970 | A | | 7/2021 | |
| JP | 2022-94037 | A | | 6/2022 | |
| WO | 2021132281 | A1 | | 7/2021 | |

OTHER PUBLICATIONS

Machine translation of WO 2021132281 A1 to Yamamoto, Takeshi et al. (Year: 2021).*
Machine translation of JP2017033526A to Inagaki, Shogo et al. (Year: 2017).*
Japanese Office Action (JPOA) dated Mar. 11, 2025 for Japanese Patent Application No. 2022-140297; English machine translation.
Japanese Office Action (JPOA) dated Jul. 29, 2025 issued for Japanese patent application No. 2022-140297 and its English machine translation.
Extended European Search Report (EESR) dated Jan. 31, 24 issued for European patent application No. 23193880.4.

* cited by examiner

*Primary Examiner* — Mi'schita' Henson
(74) *Attorney, Agent, or Firm* — RANKIN, HILL & CLARK LLP

(57) ABSTRACT

An information processing apparatus acquires pieces of normal data belonging to a plurality of intervals of measurement data measured by a device, combines the acquired pieces of normal data to generate combined data, and performs machine learning using the combined data to train a machine learning model that outputs a score indicating a normal condition of a system in which the device is installed, in response to an input of measurement data.

10 Claims, 10 Drawing Sheets

14a

| TIME PERIOD OF DAY | TEMPERATURE DATA | ACCELERATION DATA | SPEED DATA | ... |
|---|---|---|---|---|
| TIME PERIOD OF DAY #1 | TEMPERATURE DATA #1 | ACCELERATION DATA #1 | SPEED DATA #1 | ... |
| TIME PERIOD OF DAY #2 | TEMPERATURE DATA #2 | ACCELERATION DATA #2 | SPEED DATA #2 | ... |
| TIME PERIOD OF DAY #3 | TEMPERATURE DATA #3 | ACCELERATION DATA #3 | SPEED DATA #3 | ... |
| ... | ... | ... | ... | ... |

14b

| TIME PERIOD OF DAY | TEMPERATURE DATA | ACCELERATION DATA | SPEED DATA | ··· |
|---|---|---|---|---|
| TIME PERIOD OF DAY #1 TO #3 | TEMPERATURE DATA #1 TO #3 | ACCELERATION DATA #1 TO #3 | SPEED DATA #1 TO #3 | ··· |
| ··· | ··· | ··· | ··· | ··· |

(1) (2) (3)

INFORMATION PROCESSING APPARATUS, INFORMATION PROCESSING METHOD, AND COMPUTER-READABLE RECORDING MEDIUM

CROSS-REFERENCE TO RELATED APPLICATION

The present application claims priority to and incorporates by reference the entire contents of Japanese Patent Application No. 2022-140297 filed in Japan on Sep. 2, 2022.

FIELD

The present invention relates to an information processing apparatus, an information processing method, and a computer-readable recording medium.

BACKGROUND

Conventionally, there is a known technique for creating a machine learning model by displaying data files collected from devices and recorded in the past, on a display screen (viewer), selecting only one time period corresponding to "ordinary normal data" from the entire data, and running machine learning using the data as a dataset. The related technology is described, for example, in Japanese Patent Application Laid-open No. 2022-094037.

However, with such a conventional technology, it has been difficult to generate training data of normal conditions efficiently so as to allow an abnormal condition of a system to be detected. For example, assuming a plant with a device that is put into normal operation during the morning, the operation of which is stopped once for a lunch break, and then that is put into normal operation again in the afternoon, it is desirable to train the model using the data of the morning and of the afternoon. However, the conventional technology requires a selection of only one or the other.

The present invention is made in consideration of the above, and an object of the present invention is to enable effective detections of abnormal system conditions.

SUMMARY

According to an aspect of the embodiments, an information processing apparatus includes, an acquiring unit that acquires pieces of normal data belonging to a plurality of intervals of measurement data measured by a device, for each of the intervals, a generating unit that combines the acquired pieces of normal data to generate combined data, and a training unit that performs machine learning using the combined data to train a machine learning model that outputs a score indicating a normal condition of a system in which the device is installed, in response to an input of the measurement data.

According to an aspect of the embodiments, an information processing method includes, acquiring pieces of normal data belonging to a plurality of intervals of measurement data measured by a device, for each of the intervals, combining the acquired pieces of normal data to generate combined data, and performing machine learning using the combined data to train a machine learning model that outputs a score indicating a normal condition of a system in which the device is installed, in response to an input of the measurement data.

According to an aspect of the embodiments, a computer-readable recording medium having stored therein an information processing program causing a computer to execute a process, the process includes, acquiring pieces of normal data belonging to a plurality of intervals of measurement data measured by a device, for each of the intervals, combining the acquired pieces of normal data to generate combined data, and performing machine learning using the combined data to train a machine learning model that outputs a score indicating a normal condition of a system in which the device is installed, in response to an input of the measurement data.

DESCRIPTION OF EMBODIMENTS

An information processing apparatus, an information processing method, and an information processing program according to one embodiment of the present invention will now be explained in detail with reference to some drawings. The embodiment described below is not intended to limit the scope of the present invention in any way.

Embodiment

A configuration of an information processing system 100, a configuration of an information processing apparatus 10, and processes performed thereby will be explained in the order listed herein, and advantageous effects achieved by the embodiment will be described lastly.

1. Configuration of Information Processing System 100

Figure 1:
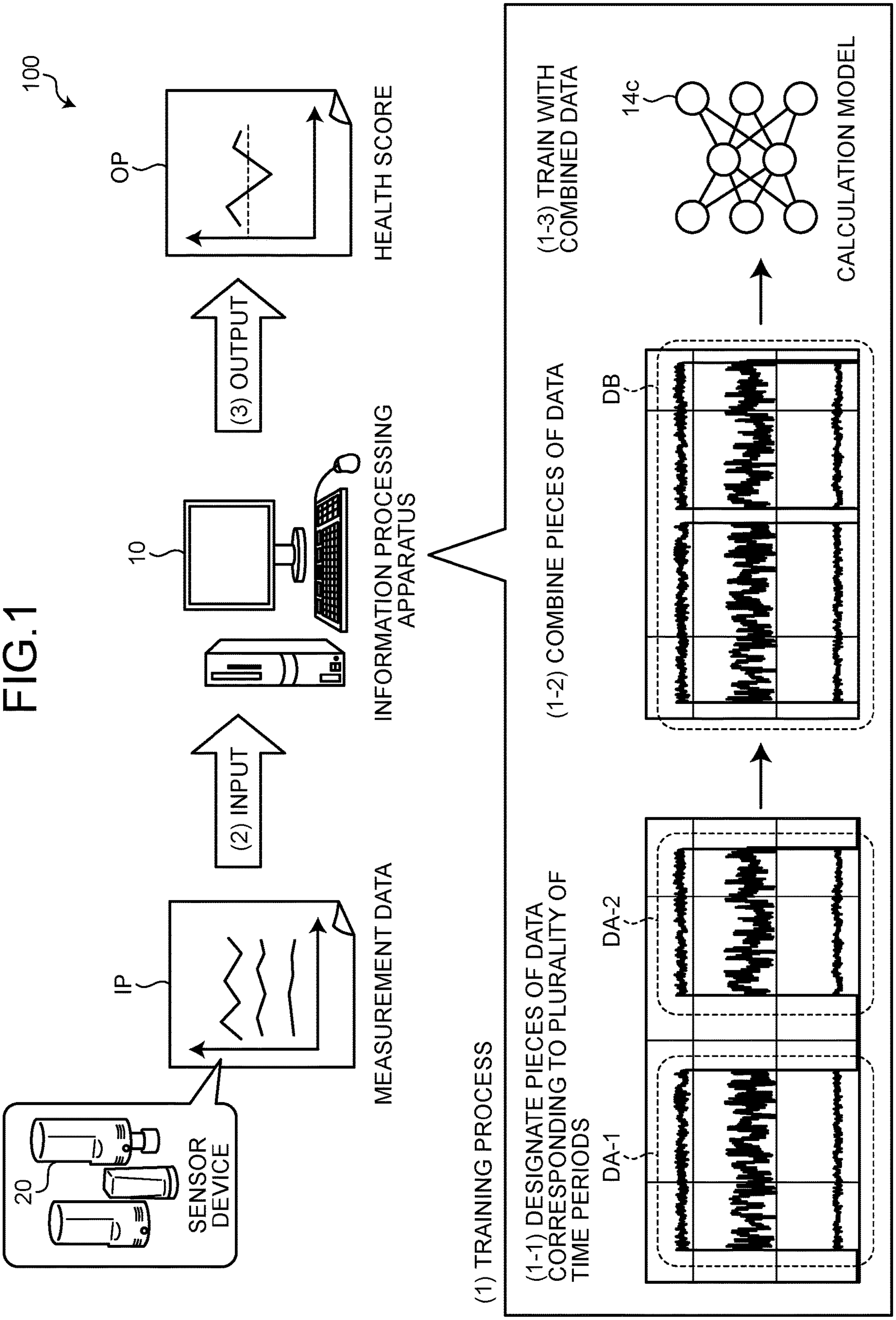
FIG. 1 is a schematic illustrating an exemplary configuration of an information processing system according to an embodiment.

The information processing system 100 according to the embodiment will now be explained in detail with reference to FIG. 1. FIG. 1 is a schematic illustrating an exemplary configuration of the information processing system 100 according to the embodiment. An exemplary configuration of the entire information processing system 100, processes performed by the information processing system 100, and problems of an information processing system of a reference technology will be explained in the order listed herein, and advantageous effects achieved by the information processing system 100 will be described lastly. In the embodiment, production monitoring using a plant device that is a device installed in a plant is used as one example, but the embodiment is not limited to any particular location or field of use, and may also be used in monitoring environment or power to detect a sign of a system failure.

1-1. Exemplary Configuration of Entire Information Processing System 100

The information processing system 100 includes the information processing apparatus 10 that is an information processing apparatus, and a sensor device 20 that is a measurement instrument. The information processing apparatus 10 and the sensor device 20 are connected to each other communicatively over a predetermined communication network. The information processing apparatus 10 is used by a user who manages plant devices including the sensor device 20. The sensor device 20 is installed in the plant. The information processing system 100 illustrated in FIG. 1 may include a plurality of information processing apparatuses 10.

In the information processing system 100, real-time measurement data IP collected from the sensor device 20 is relevant as input data to the information processing apparatus 10. In the information processing system 100, a health score OP indicating a normal condition of the system is relevant as output data from the information processing apparatus 10.

1-2. Process Performed in Entire Information Processing System 100

In the information processing system 100, to begin with, the information processing apparatus 10 performs a training process of training a calculation model 14*c* with past measurement data DA having been acquired (see (1) of FIG. 1). A user of the information processing apparatus 10 then performs a process of inputting the measurement data IP from the sensor device 20 (see (2) of FIG. 1). Finally, the information processing apparatus 10 performs a process of outputting the health score OP (see (3) of FIG. 1). As the processes performed in the information processing system 100, these training process, input process, and output process will be explained below in the order listed herein.

1-2-1. Training Process

As illustrated in (1) of FIG. 1, the information processing apparatus 10 performs a training process. For the training process, a data designating process, a data combining process, and a model training process will be explained in the order listed herein.

1-2-1-1. Data Designating Process

As illustrated in (1-1) of FIG. 1, the information processing apparatus 10 designates pieces of data belonging to a plurality of time periods. For example, the information processing apparatus 10 designates a dataset DA-1 and a dataset DA-2 that are normal data belonging to different time periods in the past measurement data DA acquired from the sensor device 20.

1-2-1-2. Data Combining Process

As illustrated in (1-2) of FIG. 1, the information processing apparatus 10 combines the pieces of data belonging to the time periods. For example, the information processing apparatus 10 concatenates the dataset DA-1 and the dataset DA-2 belonging to the different designated time periods to generate a dataset DB that is combined data corresponding to one time period.

1-2-1-3. Model Training Process

As illustrated in (1-3) of FIG. 1, the information processing apparatus 10 performs training of the calculation model 14*c* using the combined data. For example, by inputting the dataset DB that is the generated combined data to the calculation model 14*c*, the information processing apparatus 10 trains the calculation model 14*c* that outputs a health score OP representing a normal condition, from the measurement data IP.

1-2-2. Input Process

As illustrated in (2) of FIG. 1, the information processing apparatus 10 receives an input of the measurement data IP that is real-time data from the sensor device 20 that is a plant device. For example, the information processing apparatus 10 receives an input of temperature data, acceleration data, and speed data having time (time stamp) assigned thereto, as the measurement data IP transmitted by the sensor device 20.

1-2-3. Output Control Process

As illustrated in (3) of FIG. 1, the information processing apparatus 10 outputs a health score OP. For example, the information processing apparatus 10 outputs a positive score if the plant in which the sensor device 20 is installed is in a normal condition, and a negative score if the plant is in an abnormal condition, as the health score OP.

1-3. Measurement Data Used in Training Process

Figure 2:
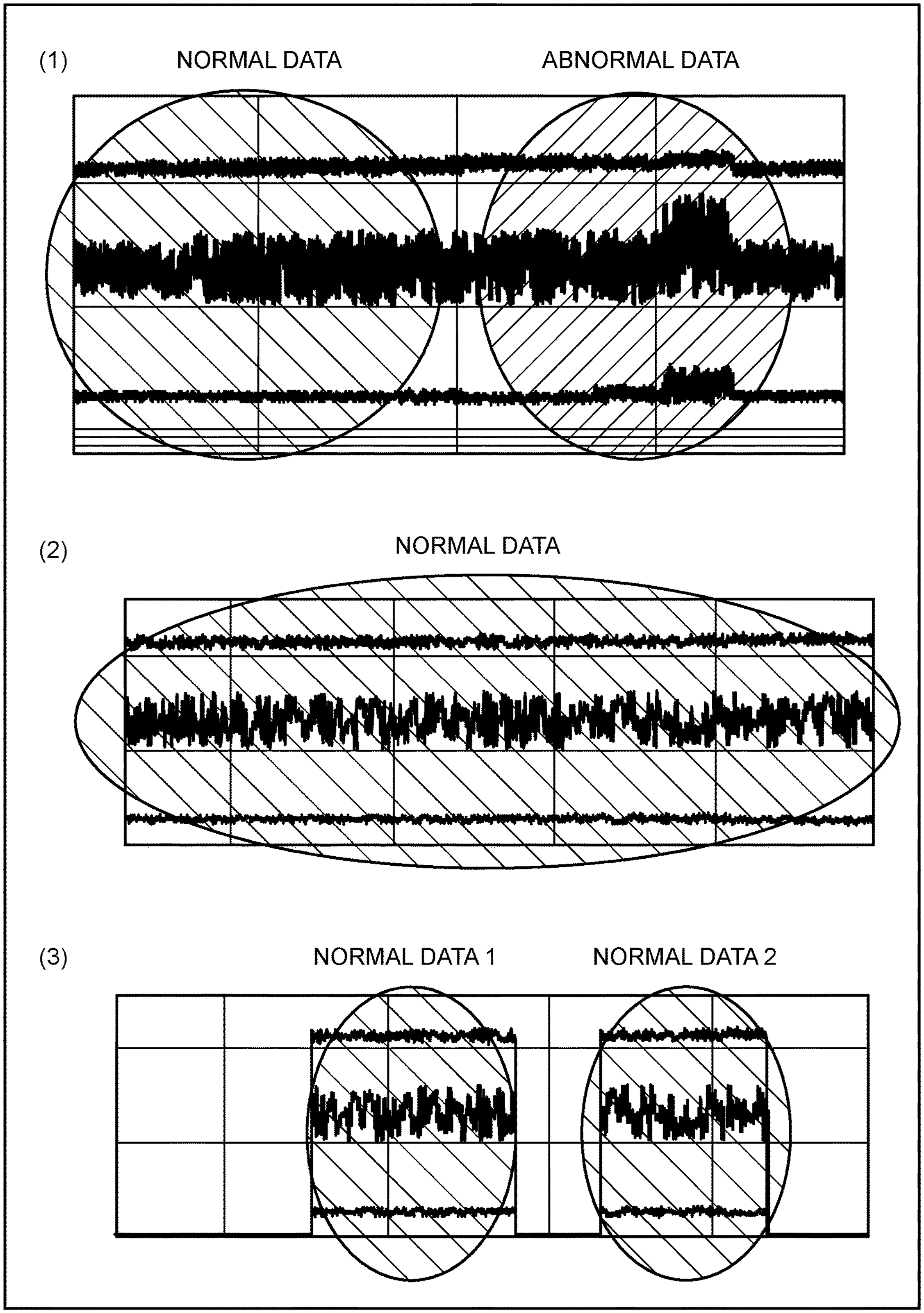
FIG. 2 is a schematic illustrating one example of measurement data according to the embodiment.

The measurement data used in the training process will now be explained with reference to FIG. 2. FIG. 2 is a schematic illustrating one example of the measurement data D according to the embodiment. As illustrated in FIG. 2, the measurement data D used in the training process is a set of pieces of data having a time stamp assigned thereto, and includes a plurality of different sensor values (such as temperature data, acceleration data, and speed data).

(1) of FIG. 2 is a waveform graph indicating a dataset including a plurality of different sensor values collected over a continuous time period, a former half of which includes a dataset in a normal condition, and the latter half of which includes a dataset in an abnormal condition. In this case, the dataset indicated as "normal data" is used as the measurement data D for the training process, while the dataset indicated as "abnormal data" is not.

(2) of FIG. 2 is a waveform graph indicating a dataset including a plurality of different sensor values collected over a continuous time period, the entire period of which has a dataset in the normal condition. In this case, the entire dataset indicated as "normal data" is used as the measurement data D for the training process.

(3) of FIG. 2 is a waveform graph illustrating a dataset including a plurality of different sensor values collected over a continuous time period, the former half and the latter half of which have a dataset in a normal condition but with a "break" period in which no sensor values are collected, therebetween. In this case, a plurality of datasets indicated as "normal data 1" and "normal data 2" are combined and used as the measurement data D for the training process.

1-4. Information Processing System of Reference Technology

An outline of an information process serving as a reference technology will be described below, and problems of the reference technology will then be explained.

1-4-1. Outline of Information Process of Reference Technology

An information process of the reference technology is performed in the following manner. First, an information processing apparatus of the reference technology displays a graph of waveforms or the like of the sensor values on the screen, as illustrated in FIG. 2. Second, the user of the information processing apparatus of the reference technology designates only one time period in the dataset, corresponding to the time period the user wants to use in the training process, in the displayed screen. Third, the information processing apparatus of the reference technology inputs the designated dataset to the calculation model, and trains the model. Fourth, the information processing apparatus of the reference technology inputs real-time measurement data collected from the sensor device to the trained calculation model, to cause the calculation model to calculate a health score indicating a normal condition of the plant.

1-4-2. Problems in Information Process of Reference Technology

Problems in the information process according to the reference technology will now be explained. First, the information processing apparatus of the reference technology designates only one time period for the training, acquires the dataset for the time period, and uses the dataset in the training of the model. In other words, among the pieces of measurement data illustrated in FIG. 2, the information processing apparatus of the reference technology can use "normal data" in (1) of FIG. 2 and "normal data" in (2) of FIG. 2, but can use only one of "normal data 1" and "normal data 2" in (3) of FIG. 2, in the training of the model (Problem 1). In the example as (3) of FIG. 2, the morning before the noon is a "morning hours" in which the operation of the plant is started and is running in the normal condition ("normal data 1"); the lunch time is a "lunch break" in which the operation is temporarily stopped; the time period past the noon and the evening is "afternoon hours" in which the operation is restarted and is running in the normal condition ("normal data 2"); and the time period from the evening to the morning is "closed hours" and the plant is not in operation. Because the information processing apparatus of the reference technology can select only one time period (interval), it is difficult to ensure a sufficient number of pieces of training data, and to make effective use of the sensor values of a plant device, such as a motor, that operate intermittently.

Second, the information processing apparatus of the reference technology does not combine nor use a plurality of datasets in the training of the model. Therefore, it is difficult to combine predicted future values or simulated values that have not yielded the results yet, with the actual values collected in the past up to the present (Problem 2).

Third, it is difficult for the information processing apparatus of the reference technology to execute the process of calculating the health score OP highly accurately, because the information processing apparatus does not combine nor use the datasets over a plurality of time periods or datasets including predicted values or the like, in the training of the model (Problem 3). In other words, when the normal data include intervals with a "break" therebetween, it is difficult for the information processing apparatus of the reference technology to improve the accuracy of the calculation process, even if datasets from a plurality of intervals are used as the training data.

1-5. Advantageous Effects Achieved by Information Processing System 100

An outline of the information processing system 100 according to the embodiment will be described below, followed by a description of advantageous effects achieved by the information processing system 100.

1-5-1. Outline of Information Processing System 100

First, the information processing apparatus 10 designates pieces of data corresponding to a plurality of time periods. Second, the information processing apparatus 10 combines the pieces of data belonging to such time periods. Third, the information processing apparatus 10 performs training of the calculation model 14*c* using the combined data. Fourth, the information processing apparatus 10 collects the measurement data IP. Fifth, the information processing apparatus 10 outputs a health score OP from the measurement data IP, using the trained calculation model 14*c*.

1-5-2. Advantageous Effects Achieved by Information Processing System 100

The information processing system 100 described above provides the following advantageous effects. First, with the information processing system 100, a plurality of time periods can be selected via a user interface (UI), and any interval can be selected from the normal data that includes a plurality of intervals with a "break" therebetween, to perform a training therewith. Therefore, a sufficient number of pieces of training data can be ensured. Hence, the information processing system 100 contributes to solving Problem 1 described above that it is difficult to effectively use the sensor values of a device that operate intermittently.

Second, with the information processing system 100, a dataset does not need to consist only of actual values with fixed results, collected up to the present time, and may also include future values predicted by simulations. Therefore, the information processing system 100 is also applicable to predictions such as "if the value is to turn out like this in the future, we should make the operation like this from now on in the future". Hence, the information processing system 100 contributes to solving Problem 2 described above that it is difficult to select a plurality of datasets including predicted future values, and to train the model therewith.

Third, with the information processing system 100, a plurality of datasets are concatenated internally, and used as a single dataset in the training, so that better artificial intelligence (AI) training results are achieved. Therefore, it is possible to improve the accuracy of AI analyses. Hence, the information processing system 100 contributes to solving Problem 3 described above that it is difficult to improve the prediction accuracy with a plurality of datasets from intervals of normal data with a "break" therebetween.

Based on the above, by ensuring a sufficient number of pieces of training data, by enabling the use of datasets including predicted future values, and by improving the accuracy of AI analysis, the information processing system 100 can detect an abnormal condition of the system effectively.

2. Configuration of Information Processing Apparatus 10

A functional configuration of the information processing apparatus 10 included in the information processing system 100 illustrated in FIG. 1 will now be explained with reference to FIGS. 3 to 10. An exemplary configuration of the information processing apparatus 10 according to the embodiment, a specific example of a display screen of the information processing apparatus 10, and a data designating process performed by the information processing apparatus 10 will be described below in detail, in the order listed herein.

2-1. Configuration of Information Processing Apparatus 10

Figures 3, 4:
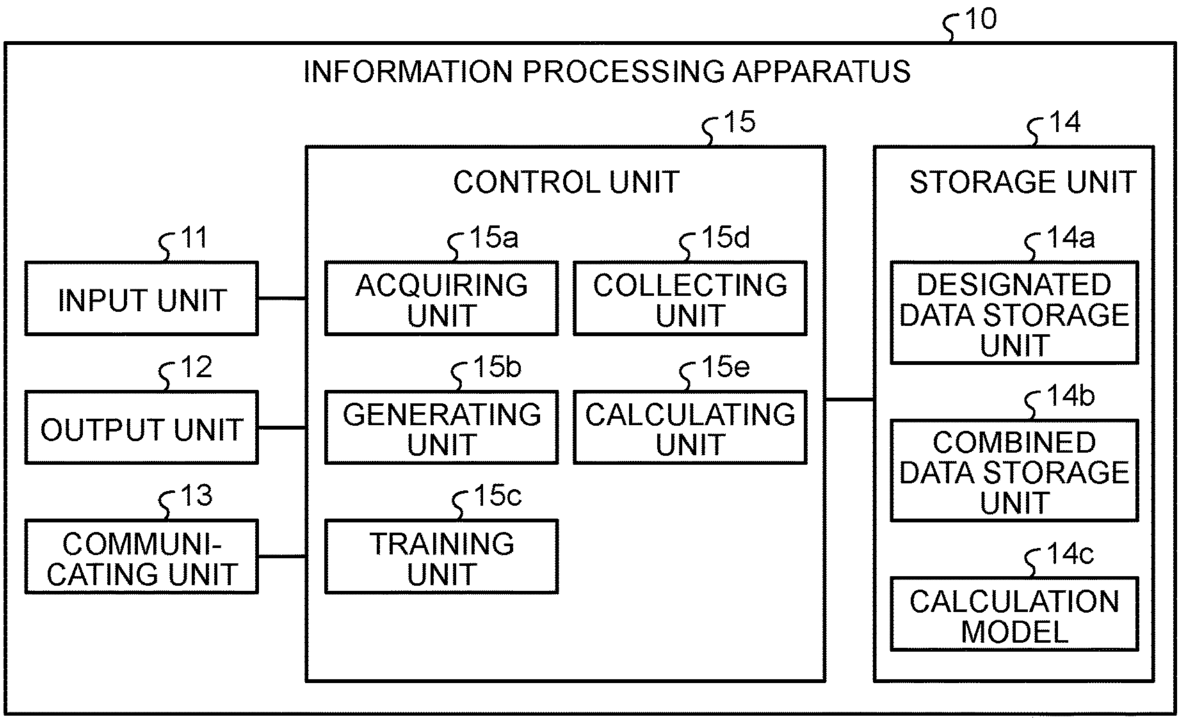
FIG. 3 is a block diagram illustrating an exemplary configuration of an information processing apparatus according to the embodiment.
FIG. 4 is a schematic illustrating one example of a designated data storage unit in the information processing apparatus according to the embodiment.

An exemplary configuration of the information processing apparatus 10 according to the embodiment will now be explained with reference to FIG. 3. FIG. 3 is a block diagram illustrating an exemplary configuration of an information processing apparatus 10 according to the embodiment. The information processing apparatus 10 includes an input unit 11, an output unit 12, a communicating unit 13, a storage unit 14, and a control unit 15.

2-1-1. Input Unit 11

The input unit 11 is implemented as, for example, a keyboard or a mouse. The input unit 11 receives various operations from the user or the like of the information processing apparatus 10. For example, the input unit 11 receives an input for designating the measurement data D to be used in the training process from the user of the information processing apparatus 10.

2-1-2. Output Unit 12

The output unit 12 is implemented as, for example, a liquid crystal display. The output unit 12 displays various types of information. For example, the output unit 12 displays a health score OP calculated by the control unit 15 in the information processing apparatus 10.

2-1-3. Communicating Unit 13

The communicating unit 13 is implemented as, for example, a network interface card (NIC). The communicating unit 13 is connected to a predetermined communication network either over the wire or wirelessly, and transmits and receives information to and from various devices.

2-1-4. Storage Unit 14

The storage unit 14 is implemented as, for example, a semiconductor memory element such as a random access memory (RAN), a flash memory, or a storage device such as a hard disk or an optical disc. The storage unit 14 according to the embodiment includes a designated data storage unit 14*a*, a combined data storage unit 14*b*, and the calculation model 14*c*, as illustrated in FIG. 3. The storage unit 14 stores therein various types of information that are referred to in the operation of the control unit 15, as well as various types of information having been acquired in the operation of the control unit 15.

2-1-4-1. Designated Data Storage Unit 14*a*

The designated data storage unit 14*a* stores therein the measurement data DA acquired by an acquiring unit 15*a* in the control unit 15, which is a dataset belonging to the interval designated by the user of the information processing apparatus 10. One example of the information stored in the designated data storage unit 14*a* will now be explained with reference to FIG. 4. FIG. 4 is a schematic illustrating one example of the designated data storage unit 14*a* in the information processing apparatus 10 according to the embodiment. In the example illustrated in FIG. 4, the designated data storage unit 14*a* includes items such as "time period of day", "temperature data", "acceleration data", and "speed data".

The "time period of day" indicates the time period of the day on which the acquired dataset is measured, and, includes start time and end time, for example. The "temperature data" indicates a temperature of the device, among the sensor values measured by the sensor device 20, and is a motor temperature expressed in units of ° C., for example. The "acceleration data" indicates information related to a vibration of the device, among the sensor values measured by the sensor device 20, and is a motor acceleration expressed in units of $m/s^2$, for example. The "speed data" indicates information related to a vibration of the device, among the sensor values measured by the sensor device 20, and is a motor speed expressed in units of m/s, for example.

In other words, FIG. 4 illustrates an example in which temperature data "temperature data #1", acceleration data "acceleration data #1", speed data "speed data #1", . . . belong to a time period of day indicated as "time period of day #1"; temperature data "temperature data #2", acceleration data "acceleration data #2", speed data "speed data #2", . . . belong to a time period of day indicated as "time period of day #2"; and temperature data "temperature data #3", acceleration data "acceleration data #3", and speed data "speed data #3", . . . belong to the time period of day indicated as "time period of day #3". In the example described above, "temperature data", "acceleration data", and "speed data" belonging to each time period of day include a plurality of pieces of data having been assigned with a time stamp at the time of the measurement.

2-1-4-2. Combined Data Storage Unit 14*b*

Figures 5, 6:
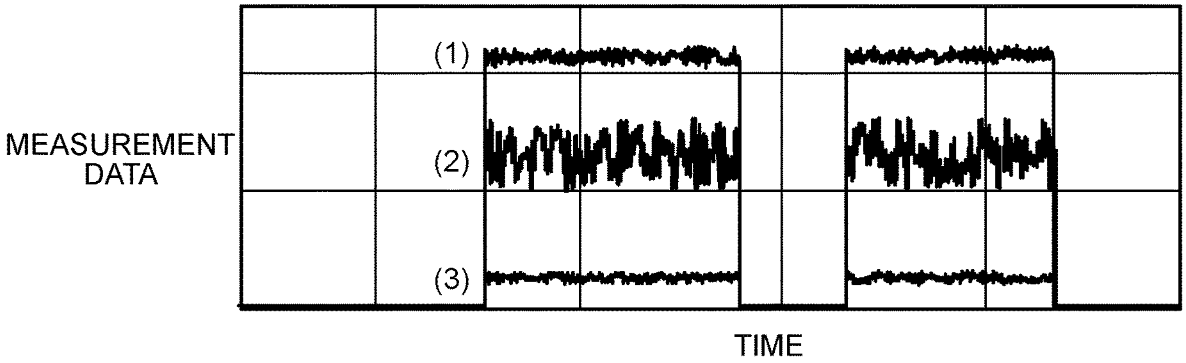
FIG. 5 is a schematic illustrating one example of a combined data storage unit in the information processing apparatus according to the embodiment.
FIG. 6 is a schematic illustrating one example of a measurement data display screen according to the embodiment.

The combined data storage unit 14*b* stores therein the combined data DB generated by a generating unit 15*b* in the control unit 15. One example of the information stored in the combined data storage unit 14*b* will now be explained with reference to FIG. 5. FIG. 5 is a schematic illustrating one example of the combined data storage unit 14*b* in the information processing apparatus 10 according to the embodiment. In the example illustrated in FIG. 5, the combined data storage unit 14*b* includes items such as "time period of day", "temperature data", "acceleration data", and "speed data".

The "time period of day" indicates the time period of day to which the combined dataset belongs, and includes start time and end time, for example. The "temperature data" indicates a temperature of the device, among the sensor values measured by the sensor device 20, and is a motor temperature expressed in units of ° C., for example. The "acceleration data" indicates information related to a vibration of the device, among the sensor values measured by the sensor device 20, and is a motor acceleration expressed in units of $m/s^2$, for example. The "speed data" indicates information related to a vibration of the device, among the sensor values measured by the sensor device 20, and is a motor speed expressed in units of m/s, for example.

In other words, FIG. 5 illustrates an example in which temperature data "temperature data #1 to #3", acceleration data "acceleration data #1 to #3", and speed data "speed data #1 to #3", . . . belong to a combined time period of day indicated as a "time period of day #1 to #3". In the example described above, "temperature data", "acceleration data", and "speed data" belonging to each time period of day include a plurality of pieces of data having been assigned with a label corresponding to the time stamp at the time of the measurement.

2-1-4-3. Calculation Model 14*c*

The calculation model 14*c* is a machine learning model trained by a training unit 15*c* in the control unit 15. For example, the calculation model 14*c* is a trained model trained by machine learning that uses real-time data such as temperature data, acceleration data, and speed data received from the sensor device 20 as explanatory variables, and the health score OP (which takes a positive score under the normal condition, and takes a negative score under an abnormal condition) indicating the normal condition of the plant in which the sensor device 20 is installed as an objective variable. For example, the calculation model 14*c* is a machine learning model trained using Random forest classification, and a binary classification method, such as a boost decision tree that is a recursive partitioning, as a classification method.

2-1-5. Control Unit 15

The control unit 15 governs the control of the entire information processing apparatus 10. The control unit 15 includes an acquiring unit 15*a*, the generating unit 15*b*, the training unit 15*c*, a collecting unit 15*d*, and a calculating unit 15*e*. The control unit 15 may be implemented as an electronic circuit such as a central processing unit (CPU) and a micro-processing unit (MPU), or an integrated circuit such as an application-specific integrated circuit (ASIC) and a field-programmable gate array (FPGA), for example.

2-1-5-1. Acquiring Unit 15*a*

The acquiring unit 15*a* acquires, for each of a plurality of intervals of the measurement data measured by the device, each piece of normal data belonging to the interval. The acquiring unit 15*a* stores the acquired measurement data in the designated data storage unit 14*a*.

As a process of the acquiring unit 15*a*, types of data to be acquired will now be explained. The acquiring unit 15*a* acquires, for each of a plurality of intervals of the measurement data collected by a plant device installed in the plant, pieces of normal data belonging to the interval.

To explain a specific example, the acquiring unit 15*a* acquires temperature data, acceleration data, and speed data corresponding to each time period of day, as the data measured by the sensor device 20, e.g., {time period of day #1: temperature data #1, acceleration data #1, speed data #1}, {time period of day #2: temperature data #2, acceleration data #2, speed data #2}, {time period of day #3: temperature data #3, acceleration data #3, speed data #3} . . . , and so on.

As a process of the acquiring unit 15*a*, a process of acquiring the data designated on the data display screen will now be explained. The acquiring unit 15*a* outputs a data display screen on which the measurement data is displayed as a predetermined graph, and acquires, for each of the intervals designated by the user on the output data display screen, pieces of normal data belonging to the interval.

For example, the acquiring unit 15*a* displays a plurality of candidate intervals on the data display screen, and acquires each piece of normal data belonging to an interval selected from the candidate intervals. To explain a specific example, as will be described later in (2-3. Specific Example of Designating Process) and (2-3-2. Designating Process 2) below, the acquiring unit 15*a* displays a data display screen displaying a graph of waveforms of the temperature data, the acceleration data, and the speed data measured by the sensor device 20, and the acquiring unit 15*a* causes the user to designate an interval from the candidate intervals by clicking on the data display screen, and acquires the dataset belonging to the designated interval.

The acquiring unit 15*a* displays the intervals the measurement data of which exceeds a predetermined threshold as candidate intervals, and acquires pieces of normal data belonging to the intervals selected from the candidate intervals. To explain a specific example, as will be described later in (2-3. Specific Example of Designating Process) and (2-3-3. Designating Process 3) below, the acquiring unit 15*a* displays a graph of waveforms of the temperature data, the acceleration data, and the speed data measured by the sensor device 20 on the data display screen, and the acquiring unit 15*a* acquires a dataset belonging to the interval designated by the user who has checked the check box, among the candidate intervals exceeding a threshold of 10.0.

As a process of the acquiring unit 15*a*, a process of acquiring the data designated on the data display screen will now be explained. The acquiring unit 15*a* outputs a data designation screen displaying intervals from which pieces of the normal data are to be acquired from the measurement data, in a manner enabling an input or a selection to be made, and acquires, for each of the intervals input or selected by the user on the output data designation screen, pieces of normal data belonging to the interval.

To explain a specific example, as will be described in (2-3. Specific Examples of Designating Process) and (2-3-1. Designating Process 1) below, the acquiring unit 15*a* acquires a dataset belonging to the interval designated by the user by clicking on the start point and the end point thereof on the data display screen displaying a graph of the waveforms of the temperature data, the acceleration data, and the speed data measured by the sensor device 20, and confirmed by the user by clicking on "OK" button on the data designation screen. In this case, the user may also enter "designated time" directly on the data designation screen, without using the data display screen, to cause the acquiring unit 15*a* to acquire a dataset belonging to the designated interval.

As a process of the acquiring unit 15*a*, a process of acquiring data for which normal or abnormal data has been determined will now be explained. Among a plurality of different types of correlated measurement data measured by the device, the acquiring unit 15*a* acquires the respective types of measurement data belonging to an interval for which all of such types of measurement data have been determined to be normal data.

To explain a specific example, in relation to numerical values such as temperature data, acceleration data, and speed data measured by the sensor device 20, correlations of which are known or presumable, if there is any interval in which all of such numerical values fall within a range between an upper threshold and a lower threshold set for the data type, the acquiring unit 15*a* acquires the measurement data belonging to such an interval as a normal dataset.

As a process of the acquiring unit 15*a*, a process of acquiring predicted data including predicted values as well as measurement data measured by the device will now be explained. The acquiring unit 15*a* further acquires predicted normal data that is normal data among the predicted data including predicted values of the measurement data.

To explain a specific example, the acquiring unit 15*a* acquires, among the numerical values predicted by applying extrapolation to the graph of the temperature data, the acceleration data, and the speed data measured by the sensor device 20, or among the numerical values simulated by applying statistical processing to the past data, those falling within a range between the upper threshold and the lower threshold set for the data type, as a normal dataset.

2-1-5-2. Generating Unit 15*b*

The generating unit 15*b* combines the acquired pieces of normal data to generate combined data. The acquiring unit 15*a* stores the acquired measurement data in the designated data storage unit 14*a*.

As a process of the generating unit 15*b*, types of data to be generated will now be explained. The generating unit 15*b* combines the pieces of normal data collected by the plant device and belonging to a plurality of intervals to generate combined data.

To explain a specific example, the generating unit 15*b* combines datasets corresponding to three respective time periods of the day measured by the sensor device 20, that is, {time period of day #1: temperature data #1, acceleration data #1, speed data #1}, {time period of day #2: temperature data #2, acceleration data #2, speed data #2}, and {time period of day #3: temperature data #3, acceleration data #3, speed data #3} to generate the combined data {time period of day #1 to #3: temperature data #1 to #3, acceleration data #1 to #3, speed data #1 to #3}.

At this time, the generating unit 15*b* may also re-assign the time stamps in the dataset. For example, the generating unit 15*b* can combine dataset 1 {time T005: data 005, time T006: data 006, time T007: data 007}, dataset 2 {time T009: data 009, time T010: data 010, time T011: data 011}, and dataset 3 {time T015: data 015, time T016: data 016, time T017: data 017}, and re-assigns the timestamps to generate combined data {time T001: data 005, time T002: data 006, time T003: data 007, time T004: data 009, time T005: data 010, time T006: data 011, time T007: data 015, time T008: data 016, time T009: data 017}.

As a process of the generating unit 15*b*, a process of generating predicted normal data including predicted values will now be explained. The generating unit 15*b* combines pieces of normal data and predicted normal data to generate combined predicted data.

To explain a specific example, the generating unit 15*b* combines three datasets corresponding to the three respective time periods of day {time period of day #1: temperature data #1, acceleration data #1, speed data #1}, {time period of day #2: temperature data #2, acceleration data #2, speed data #2}, and {time period of day #3: temperature data #3, acceleration data #3, speed data #3} measured by the sensor device 20, and one dataset {time period of day #4: temperature data #4, acceleration data #4, speed data #4} including only normal data (predicted normal data) that is predicted to be measured by the sensor device 20, to generate the combined predicted data {time period of day #1 to #4: temperature data #1 to #4, acceleration data #1 to #4, speed data #1 to #4}. At this time, the generating unit 15*b* may also generate combined predicted data by combining pieces of predicted normal data only.

2-1-5-3. Training Unit 15*c*

The training unit 15*c* performs machine learning using the combined data to train a machine learning model that outputs a score indicating the normal condition of the system in which the device is installed, in response to an input of measurement data. The training unit 15*c* trains the calculation model 14*c* stored in the storage unit 14.

As a process of the training unit 15*c*, types of data used for training will now be explained. The training unit 15*c* performs machine learning using the combined data to train a machine learning model that outputs a score indicating the normal condition of the plant in which the plant device is installed, in response to an input of measurement data.

To explain a specific example, the training unit 15*c* trains the calculation model 14*c* by inputting the combined data {time period of day #1 to #3: temperature data #1 to #3, acceleration data #1 to #3, speed data #1 to #3} generated by the generating unit 15*b* thereto.

As a process of the training unit 15*c*, a training process using the predicted normal data including predicted values will now be explained. The training unit 15*c* trains the machine learning model by running machine learning on the combined predicted data.

To explain a specific example, the calculation model 14*c* is trained by inputting the combined predicted data {time period of day #1 to #4: temperature data #1 to #4, acceleration data #1 to #4, speed data #1 to #4} generated by the generating unit 15*b* thereto.

2-1-5-4. Collecting Unit 15*d*

The collecting unit 15*d* collects the measurement data transmitted by the device. The collecting unit 15*d* may store the collected measurement data in the storage unit 14.

To explain the types of data to be collected, the collecting unit 15*d* collects motor temperature data, motor acceleration data, and motor speed data transmitted by the sensor device 20 installed in the plant.

To explain a specific example, as the real-time data transmitted by the sensor device 20, the respective types of sensor values with a time stamp assigned thereto, e.g., {time T101: temperature data 101, acceleration data 101, speed data 101} are collected.

2-1-5-5. Calculating Unit 15*e*

The calculating unit 15*e* calculates a score indicating the normal condition of the system in which the device is installed, based on the results obtained by inputting the collected measurement data to the trained machine learning model. The calculating unit 15*e* may store the calculated score in the storage unit 14.

To explain the types of the score calculated, the calculating unit 15*e* outputs a positive score if the plant in which the sensor device 20 is installed is in a normal condition, and outputs a negative score if the plant is in an abnormal condition, as a health score OP indicating the normal condition of the plant. In this case, when the score output from the calculating unit 15*e* as the health score OP is a positive score having a greater absolute value, the score indicates a condition is more normal. If the score is a negative score having a greater absolute value, the score indicates a condition that is more abnormal.

To explain a specific example, the calculating unit 15*e* calculates scores corresponding to the respective times (time stamps), where the health score OP indicates a normal value or an abnormal value, e.g., {time T101: health score "+1.0" }, {time T102: health score "−1.0" }, {time T103: health score "−2.0" }, . . . , and so on.

2-2. Example of Display Screen

Specific examples of the display screen displayed by the information processing apparatus 10 will now be explained with reference to FIGS. 6 and 7. The data display screen and the data designation screen will be explained in the order listed herein.

2-2-1. Data Display Screen

The data display screen for displaying the measurement data D as a predetermined graph will now be explained with reference to FIG. 6. FIG. 6 is a schematic illustrating one example of a display screen displaying the measurement data D, according to the embodiment. As illustrated in the example in FIG. 6, the information processing apparatus 10 displays a graph of the waveforms indicating the per-unit-time intensities of a plurality of respective pieces of measurement data D. For example, the information processing apparatus 10 can display temperature data (see (1) of FIG. 6) received from the sensor device 20 in green, acceleration data (see (2) of FIG. 6) in red, and speed data (see (3) of FIG. 6) in blue, so that these types of data can be distinguished from one another. The information processing apparatus 10 may also display these pieces of data with the vertical axis representing different scales of units depending on the data type (° C. for the temperature data, $m/s^2$ for the acceleration data, and m/s for the speed data) so that the waveforms do not overlap one another.

2-2-2. Data Designation Screen

Figure 7:
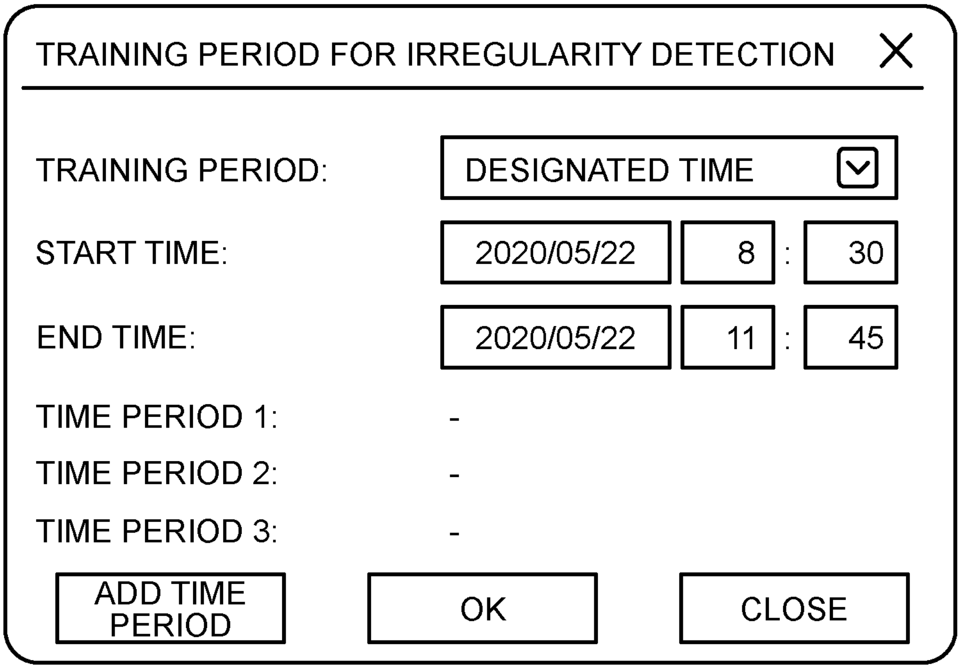
FIG. 7 is a schematic illustrating one example of a measurement data designation screen according to the embodiment.

Explained now with reference to FIG. 7 is the data designation screen that displays the intervals of the measurement data D from which the normal data is to be acquired, in a manner allowing an input or a selection to be made. FIG. 7 is a schematic illustrating one example of the screen for designating the measurement data D according to the embodiment. As illustrated in the example in FIG. 7, the information processing apparatus 10 displays "Training Period for Irregularity Detection" as a screen for designating the measurement data D to be used as the training data, where the user selects "Designated time" for "Training Period", and enters "2020/05/22 8:30" as "Start Time", and "2020/05/22 11:45" as "End time". At this time, the user can designate "Designated Time" illustrated in FIG. 7 by designating the start point and the end point on the waveform graph displayed in the data display screen illustrated in FIG. 6. When the user clicks on "Add Time Period" button, the designated time period is displayed at "Time Period 1". In the same manner, when a user designates different time periods and clicks on "Add Time Period" button, the designated time periods are displayed at "Time Period 2" and "Time Period 3", respectively. When the user then clicks on "OK" button, the designations of the time periods "Time Period 1" to "Time Period 3" are confirmed.

2-3. Specific Example of Designating Process

Figure 8:
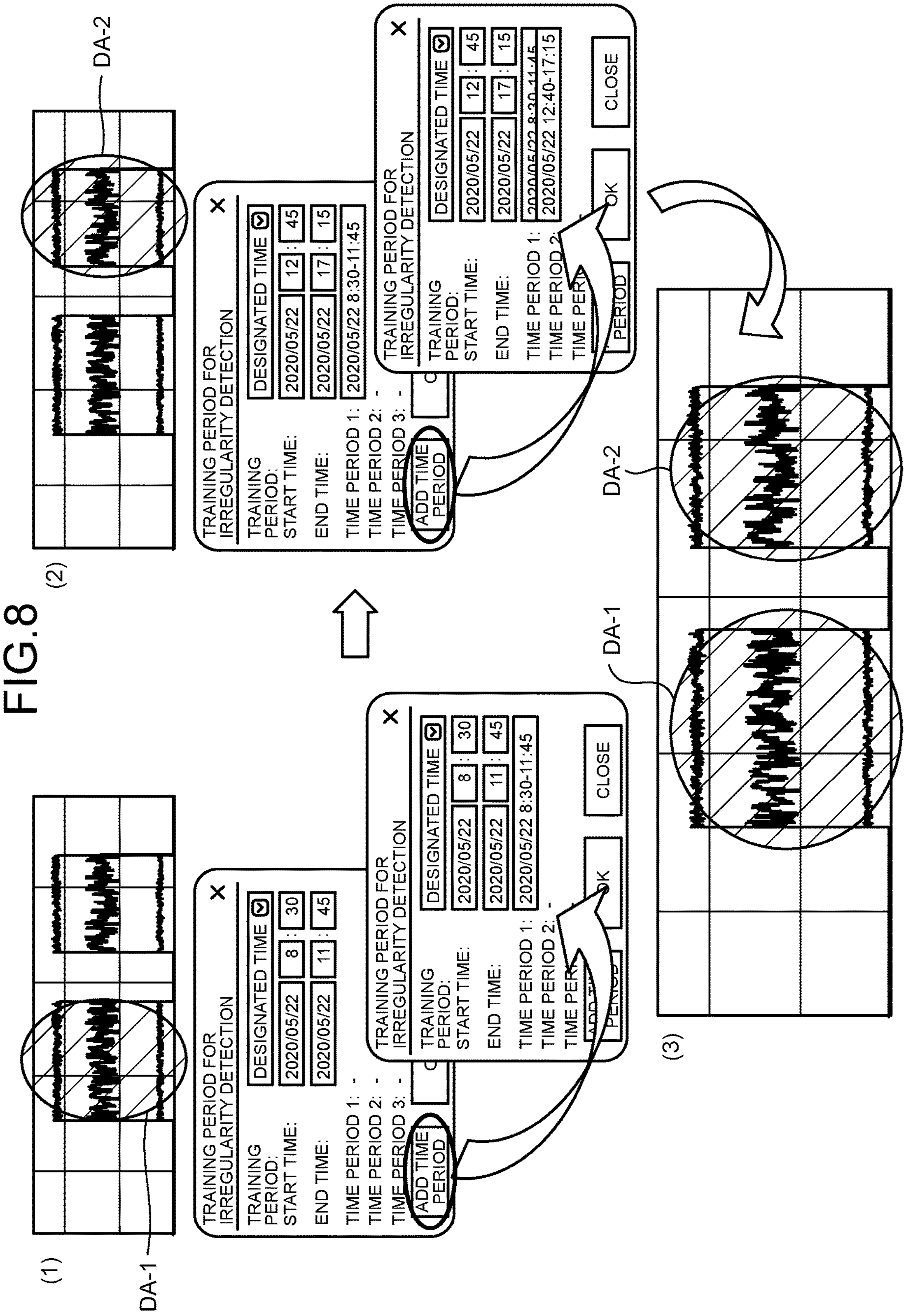
FIG. 8 is a schematic illustrating Designating Process 1 for designating measurement data according to the embodiment.
Figure 9:
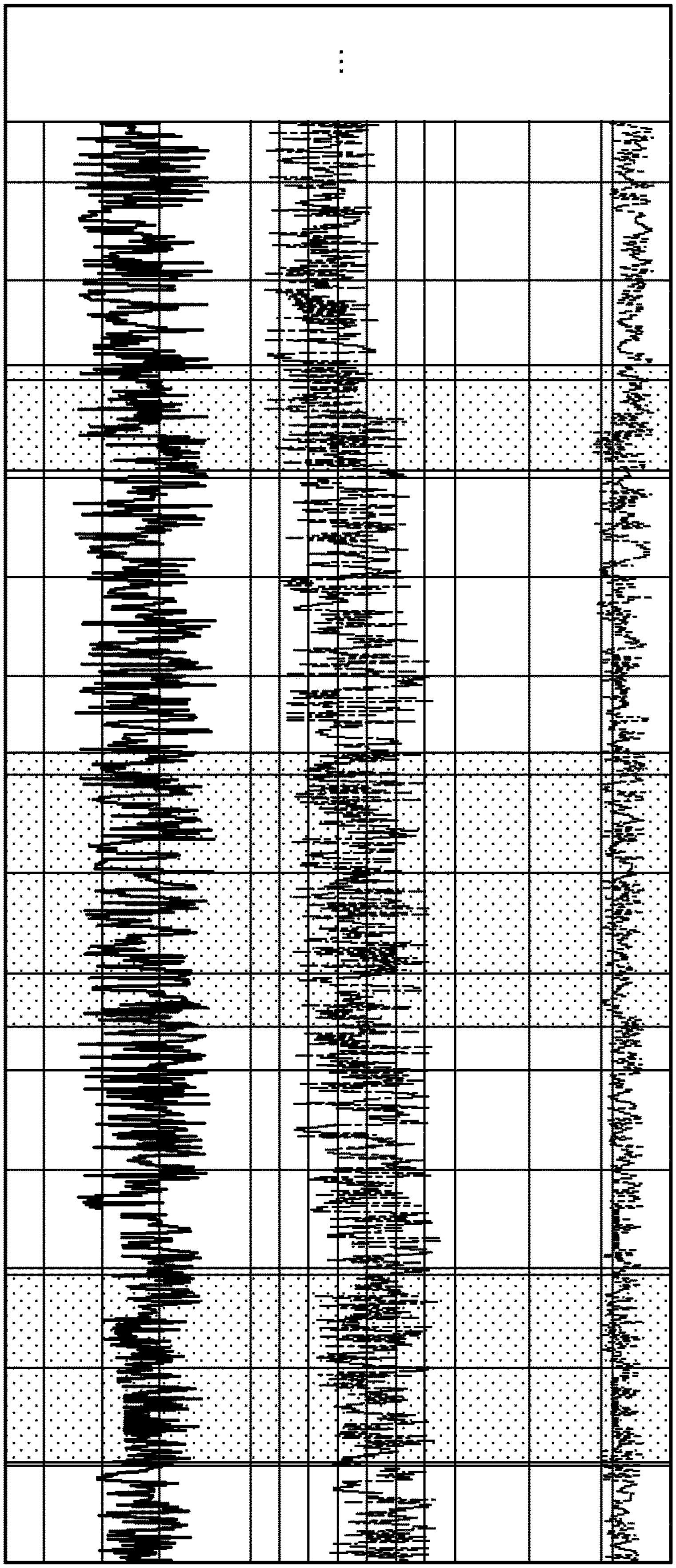
FIG. 9 is a schematic illustrating Designating Process 2 for designating measurement data according to the embodiment.
Figure 10:
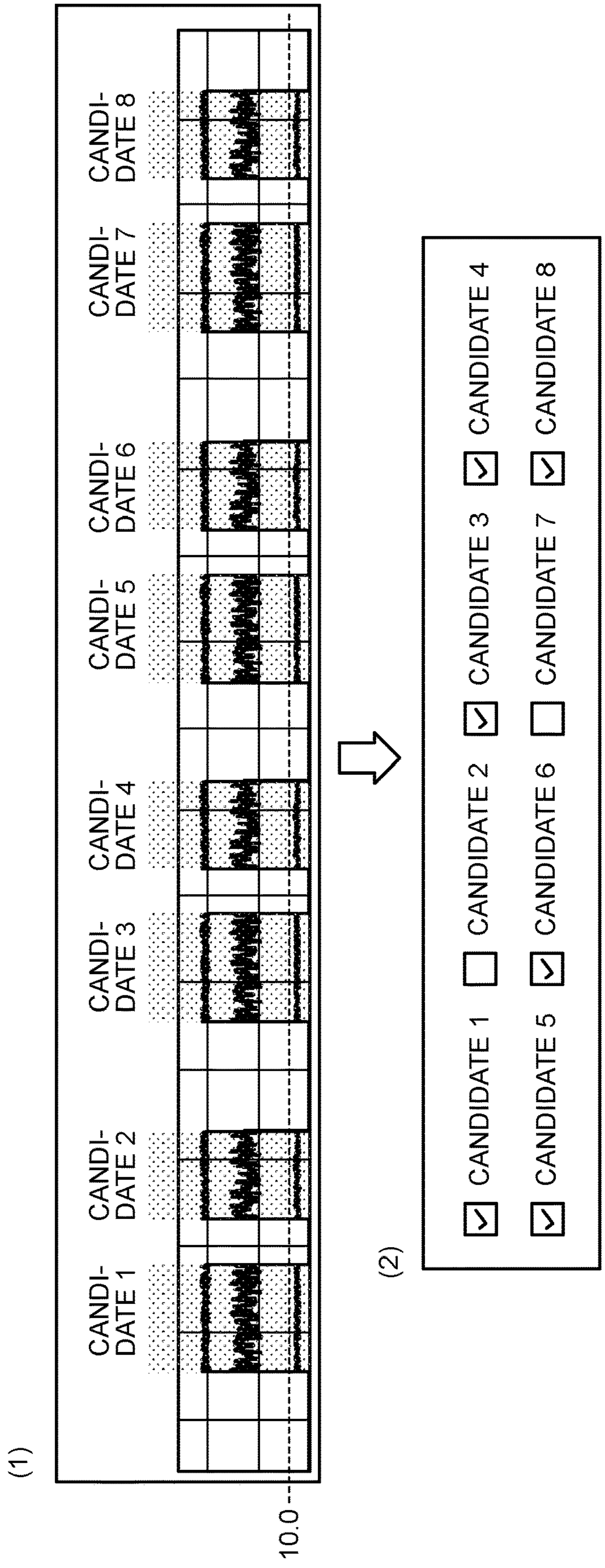
FIG. 10 is a schematic illustrating Designating Process 3 for designating measurement data according to the embodiment.

A specific example of a process of designating the measurement data D, performed by the information processing apparatus 10, will now be explained with reference to FIGS. 8 to 10. Explained below, in the order listed herein, are Designating Process 1 using the data display screen and the data designation screen, Designating Process 2 using the data display screen to display time period candidates for continuous data, and Designating Process 3 using the data display screen to display time period candidates for data with a "break".

2-3-1. Designating Process 1

Designating Process 1 for designating the measurement data D using the data display screen and the data designation screen will now be explained with reference to FIG. 8. FIG. 8 is a schematic illustrating Designating Process 1 for designating the measurement data D according to the embodiment. As illustrated in (1) of FIG. 8, the user of the information processing apparatus 10 designates a dataset DA-1 by designating the corresponding start point and end point on the waveform graph in the data display screen. The user then clicks on "Add Time Period" button, to set the designated time period "2020/05/22 8:30-11:45" to "Time Period 1". As illustrated in (2) of FIG. 8, the user of the information processing apparatus 10 designates a dataset DA-2 by designating the corresponding start point and end point on the waveform graph in the data display screen. The user then clicks on "Add Time Period" button, to set the designated time period "2020/05/22 12:30-17:15" to "Time Period 2". As illustrated in (3) of FIG. 8, the user's designations of "Time Period 1" that is the time period "2020/05/22 8:30-11:45", and "Time Period 2" that is the time period "2020/05/22 12:30-17:15" are confirmed when the user clicks on "OK" button.

With Designating Process 1 described above, only with one of the time periods having a "break" therebetween, the number of pieces of data may be insufficient to carry out sufficient training, and only with the training with a dataset corresponding to that one time period, the result of subsequent AI analysis may be unsatisfactory. Used in Designating Process 1 described above is a pattern including two time periods with a "break" therebetween, but in reality, there will be a larger number of breaks when the device is a device making irregular, intermittent operations. In Designating Process 1 described above, the number of selectable time period is limited to three at the maximum, but the number of selectable time periods may be increased, so that selections may be made flexibly without any limitation to the number of the time periods with a "break" therebetween. As described above, Designating Process 1 enables AI training to be carried out sufficiently, even from an interval of normal data including some "breaks", and so that it is possible to make a contribution in increasing the number of operation patterns to which AI analysis can be applied.

Although actual past data having recorded by a recorder is used in Designating Process 1 described above, the subject data is not limited to past data. For example, if a viewer has a function including "a capability for displaying any text data in the same manner as the data files of the recorder, as long as the text data is described in a predetermined format", the user can select a plurality of datasets including predicted future values, by simulating the predicted future values and concatenating the predicted future values with the past data, and displaying the data as continuous data. A possible application of Designating Process 1 described above includes simulating failures and making an analysis in advance so as to come up with countermeasures proactively, by asking, for example, "assuming that the current operation is to continue, at what point in the future will a failure occur if the value of this channel exceeds the threshold by how much?"

2-3-2. Designating Process 2

Designating process 2 for displaying the time period candidates of continuous data using the data display screen will now be explained with reference to FIG. 9. FIG. 9 is a schematic illustrating Designating Process 2 for designating the measurement data D according to the embodiment. As indicated as (1) to (3) of FIG. 9, the information processing apparatus 10 displays a plurality of candidate intervals (shaded sections) on the data display screen. The user then clicks on the section corresponding to the interval the user wishes to designate, from the candidate intervals (1) to (3) of FIG. 9, to confirm the designation of the interval. The user may also change the start point (start time) and end point (end time) by dragging the displayed candidate section.

In other words, in Designating Process 2 described above, a plurality of selections can be made simultaneously at the time of making a selecting operation on the waveform display, instead of using a dialog box (data designation screen) as a selection UI. By contrast, in Designating Process 2 described above, when the selection UI is displayed as a dialog box, a plurality of selection time periods may be preset as already selected.

2-3-3. Designating Process 3

Designating Process 3 using the data display screen to display time period candidates for data with "breaks" will now be explained with reference to FIG. 10. FIG. 10 is a schematic illustrating Designating Process 3 for designating the measurement data D according to the embodiment. As illustrated in (1) of FIG. 10, the information processing apparatus 10 displays a plurality of candidate intervals (shaded sections) on the data display screen. At this time, the information processing apparatus 10 displays the intervals where the predetermined threshold (10.0) is exceeded, as a plurality of section candidates (shaded sections), on the data display screen. The user confirms the designations of the intervals by checking the checkboxes corresponding to the respective candidates the user wishes to designate, among the those on the display (candidate 1, candidate 3, candidate 4, candidate 5, candidate 6, candidate 8), as illustrated in (2) of FIG. 10.

In other words, because manual selections of time periods are cumbersome for the user when there are many candidate time periods, in Designating Process 3 described above, parts having "breaks" therebetween are automatically searched and listed as candidates of the training time periods, so that the user can select any time period from that list. For example, in Designating Process 3 described above, in order to determine whether a time period is a time period including any "break", a condition setting, such as "List time periods other than those with values below the lower threshold of 10.0, considering such time periods as down time periods", may be received from the user in advance.

3. Sequence of Process performed by Information Processing System 100

Figure 11:
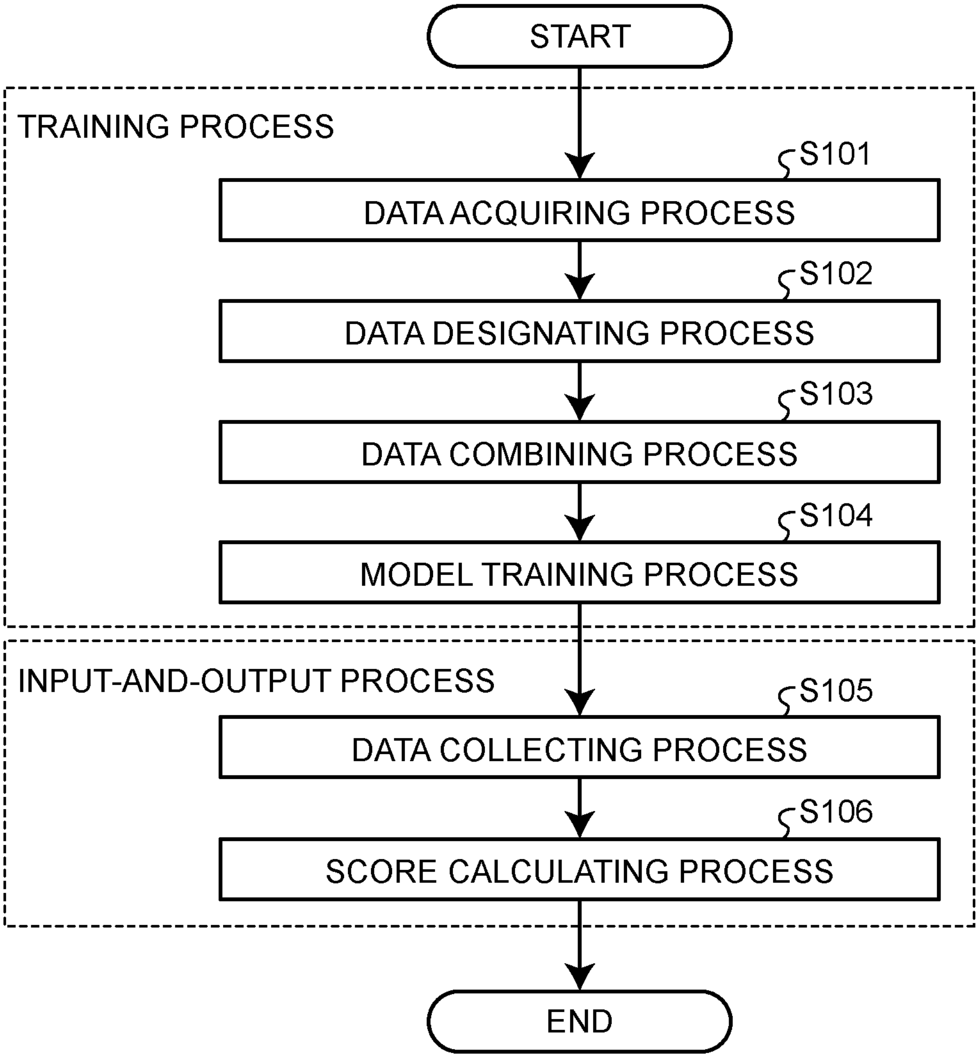
FIG. 11 is a flowchart illustrating one example of the sequence of the entire information process according to the embodiment.

The sequence of processes performed by the information processing system 100 according to this embodiment will now be explained with reference to FIG. 11. FIG. 11 is a sequence chart illustrating one example of the sequence of the entire information process according to the embodiment. The processes at Steps S101 to S106 described below may be performed in a different order. Some of the processes at Steps S101 to S106 described below may also be omitted. As the sequence of the processes performed by the information processing system 100, the training process and an input-and-output process will be explained, in the order listed herein.

3-1. Training Process

First, the information processing apparatus 10 performs the data acquiring process (Step S101). For example, the information processing apparatus 10 acquires the past measurement data DA measured by the sensor device 20.

Second, the information processing apparatus 10 performs the data designating process (Step S102). For example, the information processing apparatus 10 designates the dataset DA-1 and the dataset DA-2 that are pieces of normal data belonging to different time periods of the past measurement data DA.

Third, the information processing apparatus 10 performs the data combining process (Step S103). For example, the information processing apparatus 10 concatenates the dataset DA-1 and the dataset DA-2 belonging to the different designated time periods to generate a dataset DB that is combined data corresponding to one time period.

Fourth, the information processing apparatus 10 performs the model training process (Step S104). For example, by inputting the dataset DB that is the generated combined data to the calculation model 14*c*, the information processing apparatus 10 trains the calculation model 14*c* that outputs a health score OP representing a normal condition, from the measurement data IP.

3-2. Input-and-Output Process

First, the information processing apparatus 10 performs a data collecting process (Step S105). For example, the information processing apparatus 10 receives an input of temperature data, acceleration data, and speed data having a time stamp assigned thereto, as the measurement data IP transmitted by the sensor device 20.

Second, the information processing apparatus 10 performs a score calculating process (Step S106). For example, the information processing apparatus 10 outputs a positive score if the plant in which the sensor device 20 is installed is in a normal condition, and a negative score if the plant is in an abnormal condition, as the health score OP.

4. Advantageous Effects Achieved in Embodiment

Finally, advantageous effects achieved in the embodiment will now be explained. Advantageous effects 1 to 9 corresponding to the processes according to the embodiment will be explained below.

4-1. Advantageous Effect 1

First, in the process according to the embodiment described above, the information processing apparatus 10 acquires pieces of normal data belonging to a plurality of intervals of measurement data measured by a device, for each of the intervals; combines the acquired pieces of normal data to generate combined data; and performs machine learning using the combined data to train a machine learning model that outputs a score indicating a normal condition of a system in which the device is installed, in response to an input of measurement data. Therefore, this process makes it possible to detect an abnormal condition of the system effectively.

4-2. Advantageous Effect 2

Second, in the process according to the embodiment described above, the information processing apparatus 10 outputs a data display screen on which the measurement data is displayed as a predetermined graph, and acquires, for each of the intervals designated by the user on the output data display screen, each piece of normal data belonging to the interval. Therefore, by running a training process using the measurement data designated on the data display screen, this process makes it possible to detect an abnormal condition of the system effectively.

4-3. Advantageous Effect 3

Third, in the process according to the embodiment described above, the information processing apparatus 10 displays a plurality of candidate intervals on the data display screen, and acquires a piece of normal data belonging to the interval selected from the candidate intervals. Therefore, by running a training process using the measurement data of the interval designated from the candidates displayed on the data display screen, this process makes it possible to detect an abnormal condition of the system effectively.

4-4. Advantageous Effect 4

Fourth, in the process according to the embodiment described above, the information processing apparatus 10 displays the intervals the measurement data of which exceeds a predetermined threshold as candidate intervals, and acquires each piece of normal data belonging to the interval selected from the candidate intervals. Therefore, by running a training process using the measurement data designated from the candidates displayed on the data display screen based on the threshold, this process makes it possible to detect an abnormal condition of the system effectively.

4-5. Advantageous Effect 5

Fifth, in the processing according to the embodiment described above, the information processing apparatus 10 outputs a data designation screen displaying intervals from which pieces of normal data are to be acquired from the measurement data, in a manner enabling an input or a selection to be made, and acquires, for each of the intervals input or selected by the user on the output data designation screen, each piece of normal data belonging to the interval. Therefore, by running a training process using the measurement data designated on the data designation screen, this process makes it possible to detect an abnormal condition of the system effectively.

4-6. Advantageous Effect 6

Sixth, in the process according to the embodiment described above, the information processing apparatus 10 acquires, among a plurality of different types of correlated measurement data measured by the device, the respective types of measurement data belonging to an interval for which all of such types of measurement data have been determined to be normal data. Therefore, by determining a plurality of different types of measurement data as normal data efficiently, and running a training process using the measurement data, this process makes it possible to detect an abnormal condition of the system effectively.

4-7. Advantageous Effect 7

Seventh, in the process according to the embodiment described above, the information processing apparatus 10 also acquires predicted normal data that is normal pieces of predicted data including predicted values of measurement data, combines the pieces of normal data and the predicted normal data to generate combined predicted data, and trains a machine learning model by running machine learning on the combined predicted data. Therefore, by running a training process using future measurement data as well as past measurement data, this process makes it possible to detect an abnormal condition of the system effectively.

4-8. Advantageous Effect 8

Eighth, in the process according to the embodiment described above, the information processing apparatus 10 collects measurement data transmitted by the device, and calculates a score indicating the normal condition of the system in which the device is installed, based on the results obtained by inputting the collected measurement data to the trained machine learning model. Therefore, by visualizing the normal or abnormal condition of the system properly using real-time data, this process makes it possible to detect an abnormal condition of the system effectively.

4-9. Advantageous Effect 9

Ninth, in the process according to the embodiment described above, the information processing apparatus 10 acquires pieces of normal data belonging to a plurality of intervals of the measurement data collected by a plant device installed in the plant; combines the pieces of normal data collected by the plant device and belonging to the intervals to generate combined data; and performs machine learning using the combined data to train a machine learning model that outputs a score indicating the normal condition of the plant in which the plant device is installed, in response to an input of measurement data. Therefore, by running a training process using measurement data collected from the plant device in the plant, this process makes it possible to detect an abnormal condition of the plant effectively.

System

The processing sequence, the control sequence, the specific names, and information including various types of data and parameters indicated above or in the drawings may be changed in any way, unless specified otherwise.

The elements of each of the devices illustrated are merely functional and conceptual representations, and do not always need to be physically configured in the manner illustrated. In other words, specific configurations in which the devices are distributed or integrated are not limited to those illustrated in the drawings. To put it in other words, whole or a part thereof may be functionally or physically distributed or integrated into any units, depending on various loads and utilizations.

Furthermore, whole or any part of the processing functions executed in each of the devices may be implemented as a central processing unit (CPU) and a computer program parsed and executed by the CPU, or as hardware using wired logics.

Hardware

Figure 12:
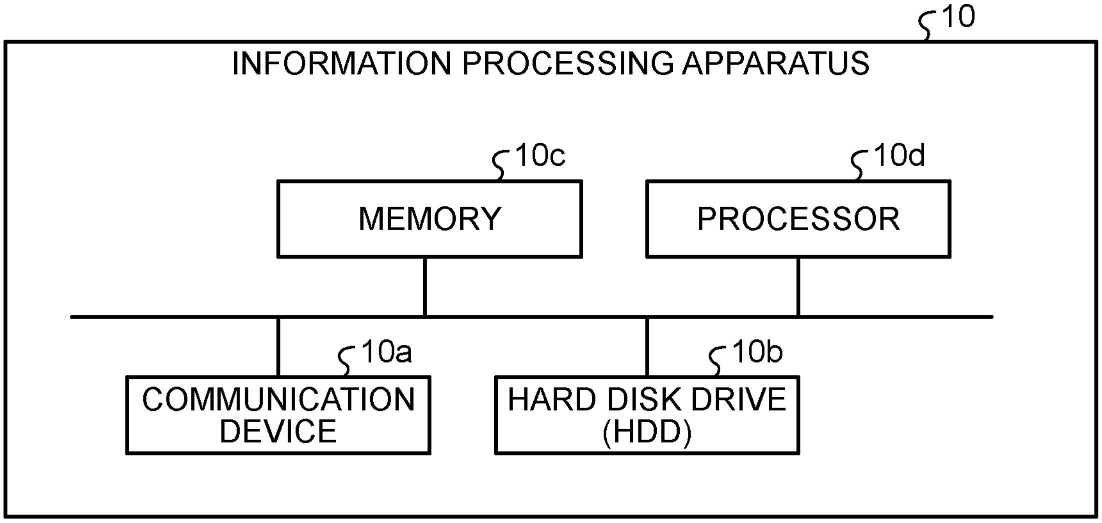
FIG. 12 is a schematic for explaining an exemplary hardware configuration.

An exemplary hardware configuration of the information processing apparatus 10 will now be explained. Other devices such as the information processing apparatus 10 may have the same hardware configuration. FIG. 12 is a schematic for explaining the exemplary hardware configuration. As illustrated in FIG. 12, the information processing apparatus 10 includes a communication device 10*a*, a hard disk drive (HDD) 10*b*, a memory 10*c*, and a processor 10*d*. The units illustrated in FIG. 12 are connected to one another via a bus, for example.

The communication device 10*a* is a network interface card, for example, and communicates with another server. The HDD 10*b* stores therein a computer program for operating the functions illustrated in FIG. 3 and a database (DB).

The processor 10*d* runs processes for performing the functions explained with reference to FIG. 3 or the like, by reading a computer program for executing processes that are the same as those executed by the processing units illustrated in FIG. 3 from the HDD 10*b*, for example, and loading the computer program onto the memory 10*c*. For example, this process performs the same functions as those performed by the processing units included in the information processing apparatus 10. Specifically, the processor 10*d* reads a computer program having the same functions as those of the acquiring unit 15*a*, the generating unit 15*b*, the training unit 15*c*, the collecting unit 15*d*, and the calculating unit 15*e*, for example, from the HDD 10*b* or the like. The processor 10*d* then performs the processes for performing the same processes as those performed by acquiring unit 15*a*, the generating unit 15*b*, the training unit 15*c*, the collecting unit 15*d*, and the calculating unit 15*e*, for example.

By reading and executing a computer program in the manner described above, the information processing apparatus 10 operates as an apparatus executing various types of processing method. The information processing apparatus 10 may also implement the functions that are the same as those described in the embodiment, by causing a medium reading device to read the computer program described above from a recording medium, and by executing the computer program. The computer program mentioned in this other embodiment is not limited to that executed by the information processing apparatus 10. For example, the present invention may be applied in the same manner in configurations in which another computer or a server performs the computer program, or in which these devices execute the computer program by cooperating with each other.

This computer program may be distributed over a network such as the Internet. This computer program may be implemented in a manner recorded in a computer-readable recording medium, such as a hard disk, a flexible disk (FD), a compact disc read-only memory (CD-ROM), a magneto-optical disc (MO), or a digital versatile disc (DVD), and performed by causing a computer to read the computer program from the recording medium and executing the computer program.

This invention has the advantageous effect of making it possible to detect an abnormal condition of the system effectively.

What is claimed is:

1. An information processing apparatus comprising a processor configured to:

acquire pieces of normal data belonging to a plurality of intervals of first measurement data previously measured by a device, for each of the intervals;

acquire predicted normal data that is normal data among pieces of predicted data including predicted values of the first measurement data;

combine the acquired pieces of normal data and the predicted normal data by concatenating the acquired pieces of normal data and the predicted normal data to generate combined predicted data;

train a machine learning model by performing machine learning using the combined predicted data, wherein the machine learning model outputs a first score indicating a normal condition of a system in which the device is installed, in response to an input of the first measurement data;

input second measurement data transmitted by the device to the trained machine learning model to output a second score indicating a normal condition of the system in which the device is installed; and detect an abnormal condition or a normal condition of the system based on the output second score.

2. The information processing apparatus according to claim 1, wherein the processor is further configured to output a data display screen displaying the first measurement data using a predetermined graph, and acquire, for each of the plurality of intervals designated by a user on the output data display screen, each piece of normal data belonging to the interval.

3. The information processing apparatus according to claim 2, wherein the processor is further configured to display a plurality of candidate intervals on the data display screen, and acquire each piece of normal data belonging to an interval selected from the candidate intervals.

4. The information processing apparatus according to claim 3, wherein the processor is further configured to display intervals including the first measurement data exceeding a predetermined threshold as the candidate intervals, and acquire pieces of normal data belonging to an interval selected from the candidate intervals.

5. The information processing apparatus according to claim 1, wherein the processor is further configured to output a data designation screen displaying intervals from which pieces of normal data are to be acquired from the first measurement data, in a manner enabling an input or a selection to be made, and acquire, for each of the plurality of intervals input or selected by the user on the output data designation screen, each piece of normal data belonging to the interval.

6. The information processing apparatus according to claim 1, wherein the processor is further configured to acquire, among a plurality of different types of correlated first measurement data previously measured by the device, the respective types of measurement data belonging to an interval for which all of such types of first measurement data have been determined to be normal data.

7. The information processing apparatus according to claim 1, wherein the device is a plant device installed in a plant.

8. An information processing method comprising:

acquiring pieces of normal data belonging to a plurality of intervals of first measurement data previously measured by a device, for each of the intervals;

acquiring predicted normal data that is normal data among pieces of predicted data including predicted values of the first measurement data;

combining the acquired pieces of normal data and the predicted normal data by concatenating the acquired pieces of normal data and the predicted normal data to generate combined predicted data;

training a machine learning model by performing machine learning using the combined predicted data, wherein the machine learning model outputs a first score indicating a normal condition of a system in which the device is installed, in response to an input of the first measurement data;

inputting second measurement data transmitted by the device to the trained machine learning model to output a second score indicating a normal condition of the system in which the device is installed; and detecting an abnormal condition or a normal condition of the system based on the output second score.

9. A non-transitory computer-readable recording medium having stored therein an information processing program causing a computer to execute the information processing method according to claim 8.

10. An information processing apparatus comprising a processor configured to:

acquire pieces of normal data belonging to a plurality of intervals of first measurement data previously measured by a device, for each of the intervals;

combine the acquired pieces of normal data by concatenating the acquired pieces of normal data and reassigning timestamps to the concatenated data to generate combined data as a single continuous time-series dataset;

train a machine learning model by performing machine learning using the combined data, wherein the machine learning model outputs a score indicating a normal condition of a system in which the device is installed, in response to an input of the first measurement data;

input second measurement data transmitted by the device to the trained machine learning model to output a second score indicating a normal condition of the system in which the device is installed; and detect an abnormal condition or a normal condition of the system based on the output second score.

* * * * *